Patented Jan. 6, 1942

2,268,649

UNITED STATES PATENT OFFICE 2,268,649

MANUFACTURE OF ARTIFICIAL FILAMENTS, YARNS, FOILS, AND SIMILAR MATERIALS, MADE OF CELLULOSE OR CELLULOSE DERIVATIVES

Henry Dreyfus, London, England

No Drawing. Application October 3, 1939, Serial No. 297,681. In Great Britain October 24, 1938

11 Claims. (Cl. 8—120)

This invention relates to improvements in the manufacture of artificial materials and particularly to improvements in the manufacture of artificial filaments, yarns, foils and similar materials made of cellulose or cellulose derivatives According to the present invention artificial materials having a basis of cellulose or cellulose derivatives, particularly cellulose acetate or other organic derivative of cellulose, are esterified by reacting the materials with a mixture of an anhydride of an organic polycarboxylic acid and carbonyl chloride or thiocarbonyl chloride. The reaction may be carried out so as to obtain products containing free carboxy groups which are soluble in organic solvents or products which are insoluble in organic solvents. The latter products in general have an improved safe ironing temperature, e. g. an ironing temperature of 25° C. or more higher than that of the materials from which they are produced, and also, when produced from thermoplastic cellulose derivatives, an increased melting point. The reaction may be carried out at relatively low temperatures, e. g. 30–60° C., but in order to obtain the best results, particularly the improvement in ironing temperature and melting point, considerably higher temperatures should be employed, preferably between 100 and 200° C. and particularly between about 120 and 160° C.

The process of the present invention is preferably carried out by treating the materials with the organic acid anhydride in the presence of a suitable solvent for the anhydride and of carbonyl chloride or thiocarbonyl chloride. In general, it is found that carbonyl chloride gives better results than thiocarbonyl chloride. The solvent employed for the acid anhydride should be a non-solvent for the materials, though it may have a swelling action on them. Thus, for example, cellulose acetate yarns in hank form may be immersed in xylene containing phthalic anhydride or other polybasic acid anhydride and maintained at its boiling point and carbonyl chloride bubbled through the reaction medium.

As examples of acid anhydrides which may be employed may be mentioned the anhydrides of malonic, succinic, glutaric, adipic, citric and other polybasic aliphatic acids and of phthalic acid, tetra-chlorphthalic acid and hexahydrophthalic acid.

The process of the present invention is of particular value for the treatment of yarns in fabric or other form, foils and similar products having a basis of commercial acetone-soluble cellulose acetate, but it is also applicable to the treatment of materials of other cellulose acetates and other cellulose derivatives, for example materials having a basis of cellulose propionate or cellulose butyrate or ethyl or propyl cellulose. Moreover, regenerated cellulose and natural cellulose materials may also be treated according to the process of the present invention. For example, yarns having a basis of regenerated cellulose obtained by the saponification of cellulose acetate yarns or by the viscose, cuprammonium or nitrocellulose process may be treated.

Example 1

A cellulose acetate woven fabric is treated in an esterification medium containing 98% of xylene and 2% of phthalic anhydride at about 140° C. for 1 hour. The volume ratio of bath to fabric is about 50:1. Carbonyl chloride is bubbled through the reaction medium during the whole of the treatment. In this manner a product having a substantially increased safe ironing temperature and melting point is obtained. It is insoluble in both acetone and chloroform.

Example 2

Regenerated cellulose yarn in hank form is treated in a bath containing 5% of adipic anhydride and 95% toluene, the ratio of the bath to fabric being about 100:1. The temperature employed is about 110° C. Carbonyl chloride is bubbled through the reaction medium during the whole of the treatment, which is continued until a product having the desired content of adipic acid radical is obtained.

Having described my invention, what I desire to secure by Letters Patent is:

1. Process for the treatment of yarns, foils and similar articles made of cellulosic material, which comprises esterifying them in a medium which is a non-solvent for the articles and which comprises the anhydride of a polycarboxylic acid and a compound having the formula $CXCl_2$, where X represents an atom selected from the group consisting of oxygen and sulphur.

2. Process for the treatment of yarns, foils and similar articles made of an organic derivative of cellulose, which comprises esterifying them in a medium which is a non-solvent for the articles and which comprises the anhydride of a polycarboxylic acid and a compound having the formula $CXCl_2$, where X represents on atom selected from the group consisting of oxygen and sulphur.

3. Process for the treatment of yarns, foils and similar articles made of cellulose acetate, which comprises esterifying them in a medium which is a non-solvent for the articles and which comprises the anhydride of a polycarboxylic acid and a compound having the formula $CXCl_2$, where X represents an atom selected from the group consisting of oxygen and sulphur.

4. Process for the treatment of yarns, foils and similar articles made of regenerated cellulose, which comprises esterifying them in a medium which is a non-solvent for the articles and which comprises the anhydride of a polycarboxylic acid and a compound having the formula $CXCl_2$, where X represents an atom selected from the group consisting of oxygen and sulphur.

5. Process for the treatment of yarns, foils and similar articles made of an organic derivative of cellulose, which comprises esterifying them in a medium which is a non-solvent for the articles and which comprises the anhydride of a dicarboxylic acid and a compound having the formula $CXCl_2$, where X represents an atom selected from the group consisting of oxygen and sulphur.

6. Process for the treatment of yarns, foils and similar articles made of cellulose acetate, which comprises esterifying them in a medium which is a non-solvent for the articles and which comprises adipic acid anhydride and a compound having the formula $CXCl_2$, where X represents an atom selected from the group consisting of oxygen and sulphur.

7. Process for the treatment of yarns, foils and similar articles made of cellulose acetate, which comprises esterifying them in a medium which is a non-solvent for the articles and which comprises phthalic anhydride and a compound having the formula $CXCl_2$, where X represents an atom selected from the group consisting of oxygen and sulphur.

8. Process for the treatment of yarns, foils and similar articles made of cellulose acetate, which comprises esterifying them at a temperature between 100 and 200° C. in a medium which is a non-solvent for the articles and which comprises adipic acid anhydride and a compound having the formula $CXCl_2$, where X represents an atom selected from the group consisting of oxygen and sulphur.

9. Process for the treatment of yarns, foils and similar articles made of cellulose acetate, which comprises esterifying them at a temperature between 100 and 200° C. in a medium which is a non-solvent for the articles and which comprises phthalic anhydride and a compound having the formula $CXCl_2$, where X represents an atom selected from the group consisting of oxygen and sulphur.

10. Process for the treatment of yarns, foils and similar articles made of cellulosic material, which comprises esterifying them at a temperature of between 100 and 200° C. in a medium which is a non-solvent for the articles and which comprises the anhydride of a polycarboxylic acid and a compound having the formula $CXCl_2$, where X represents an atom selected from the group consisting of oxygen and sulphur.

11. Process for the treatment of yarns, foils and similar articles made of an organic derivative of cellulose, which comprises esterifying them at a temperature of between 100 and 200° C. in a medium which is a non-solvent for the articles and which comprises the anhydride of a polycarboxylic acid and a compound having the formula $CXCl_2$, where X represents an atom selected from the group consisting of oxygen and sulphur.

HENRY DREYFUS.